US008839237B2

(12) United States Patent
Sahita et al.

(10) Patent No.: US 8,839,237 B2
(45) Date of Patent: Sep. 16, 2014

(54) METHOD AND APPARATUS FOR TAMPER RESISTANT COMMUNICATION IN A VIRTUALIZATION ENABLED PLATFORM

(75) Inventors: Ravi Sahita, Beaverton, OR (US); Uday Savagaonkar, Beaverton, OR (US); Subhash Gutti, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1509 days.

(21) Appl. No.: 11/968,062

(22) Filed: Dec. 31, 2007

(65) Prior Publication Data

US 2009/0172663 A1  Jul. 2, 2009

(51) Int. Cl.
*G06F 9/455* (2006.01)
*G06F 21/55* (2013.01)
*G06F 21/56* (2013.01)

(52) U.S. Cl.
CPC .......... *G06F 9/45533* (2013.01); *G06F 21/556* (2013.01); *G06F 21/554* (2013.01); *G06F 21/566* (2013.01)
USPC ............................................................ 718/1

(58) Field of Classification Search
None
See application file for complete search history.

(56) References Cited

U.S. PATENT DOCUMENTS

| 7,111,303 | B2 * | 9/2006 | Macchiano et al. .......... 719/313 |
| 2004/0123288 | A1 | 6/2004 | Bennett et al. |
| 2005/0076324 | A1 * | 4/2005 | Lowell et al. ................. 717/100 |
| 2005/0114855 | A1 * | 5/2005 | Baumberger .................... 718/1 |
| 2005/0240828 | A1 * | 10/2005 | Rothman et al. ................ 714/43 |
| 2006/0130060 | A1 | 6/2006 | Anderson et al. |
| 2006/0136910 | A1 | 6/2006 | Brickell et al. |
| 2007/0006175 | A1 | 1/2007 | Durham et al. |
| 2007/0169120 | A1 | 7/2007 | Schoenberg et al. |
| 2008/0134175 | A1 * | 6/2008 | Fitzgerald et al. ................ 718/1 |

* cited by examiner

*Primary Examiner* — Mengyao Zhe
(74) *Attorney, Agent, or Firm* — Blakely, Sokoloff, Taylor & Zafman LLP

(57) ABSTRACT

A method to communicate information between components in a virtualization enabled platform. In one embodiment, a component exchanges data via a communication page which only integrity protected components can access. In another embodiment, an integrity protected communication broker exchanges data from a communication page of one component to another communication page of another component.

9 Claims, 3 Drawing Sheets

METHOD AND APPARATUS FOR TAMPER RESISTANT COMMUNICATION IN A VIRTUALIZATION ENABLED PLATFORM

BACKGROUND OF THE INVENTION

1. Field of the Invention

The invention relate generally to providing security for communications between components in a virtualization enabled platform. More particularly, in embodiments of the invention a virtual machine monitor exchanges data between a communication page of a first component and a communication page of a second component.

2. Background Art

The integrity of a virtualization enabled platform may be compromised when security threats exploit communication mechanisms between various components of the platform. These components are subject to complex and evolving attacks by malware seeking to gain control of computer systems. Such attacks can take on a variety of different forms ranging from attempts to crash a software program to subversion of the program for alternate purposes. Additionally, programs are subject to operating system failures and bugs within other programs that can cause corruption of unrelated programs running in the same linear address space.

For example, in current models of end-point access control, a software component of a platform supporting one or more virtual machines may check the status of other software components on the platform and report that status to a policy server making access control decisions. This status checking occurs by communication between the checked component and the monitoring software component on the platform. If the communication between these components is not protected, this system is inherently insecure and the status information cannot be trusted.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments of the invention provide a channel for protecting a communication between two components in a virtualization enabled platform. As used herein, "component" refers to any of a variety of combinations of hardware- and/or software-implemented functional elements including, but not limited to, an agent, thread, application, module, operating system, etc. The communicating components may, for example, be running in the same virtual machine (VM) of the platform—e.g. executed by the same guest operating system (OS) of the VM—or in different VMs running on the same virtualization enabled platform.

Figure 1:
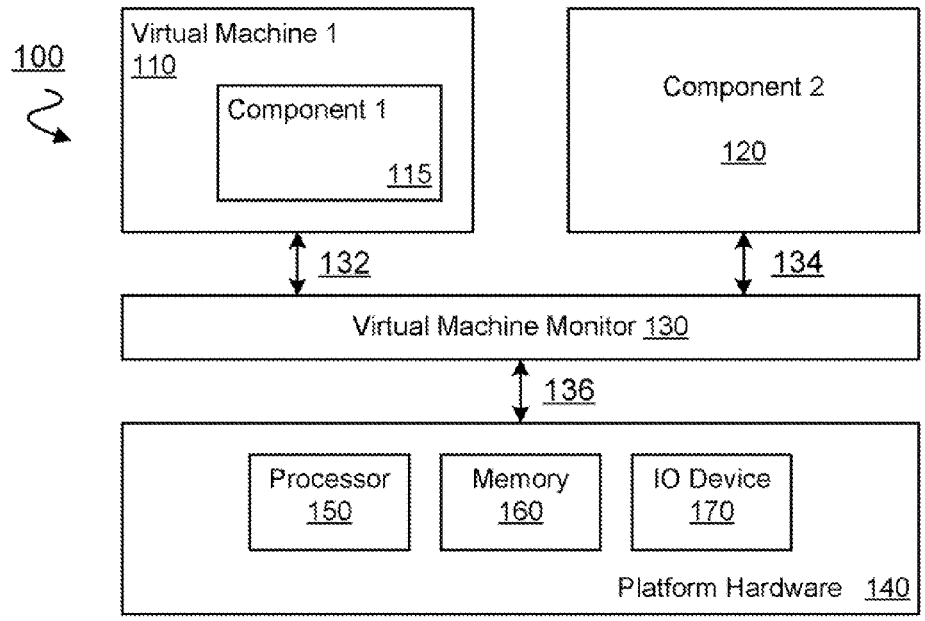
FIG. 1 is a block diagram illustrating a virtualization enabled platform capable of implementing an embodiment of the invention.

FIG. 1 is a block diagram illustrating a virtualization enabled platform 100 to implement an embodiment of the invention. Platform 100 may include a Virtual Machine 1 (VM1) 110 running a component 1 115 such as a software application or a module thereof. Platform 100 may also include a virtual machine monitor (VMM) 130 to provide a processor/platform virtualization layer to control VM1's access to platform hardware 140 of platform 100. In an embodiment of the invention, VMM 130 and VM1 110 may both execute on platform hardware 140. VMM 130 may operate at a particular privilege level which allows VMM 130 access to file systems, memory and all devices of platform 100, as discussed further below. VMM 130 may, for example, access various device drivers associated with the platform hardware 140.

The platform 100 may include a personal computer (PC), mainframe, handheld device, portable computer, set top box, or any other computing system. The platform hardware 140 may include a processor 150, memory 160 and an I/O device 170. Processor 150 may be any type of processor capable of executing software, such as a microprocessor, digital signal processor, microcontroller, or the like. Though FIG. 1 shows only one such processor 150, there may be one or more processors in platform hardware 140 and one or more of the processors may include multiple threads, multiple cores, or the like. Memory 160 may be a hard disk, a floppy disk, random access memory (RAM), read only memory (ROM), flash memory, or any other type of medium readable by processor 150. Memory 160 may store instructions for performing the execution of method embodiments of the present invention. The I/O device 170 may include, for example, any of a variety of network interface cards, communication ports, video controllers, disk controllers on system buses (e.g., Peripheral Component Interconnect (PCI), Industry Standard Architecture (ISA), Advanced Graphics Port (AGP)), devices integrated into the chipset logic or processor (e.g., real-time clocks, programmable timers, performance counters), or any other device on the platform hardware 140. The I/O device 170 may be accessed through I/O instructions, or memory mapped I/O accesses or through any other means known in the art.

VM1 110 may communicate with another component 2 120 of the platform 100. Component 2 120 may, for example, include another VM supported by VMM 130, or an application (or module thereof) running on such a VM. Although shown as being separate from VM1 110 for the purposes of illustrating an embodiment of the invention, component 2 120 may, in an embodiment, be another component of VM1 110 such as another software application component. In one embodiment, component 2 120 may be a monitoring software application or a module thereof to check on a status of component 1 115—e.g. as part of an access control service associated with component 2 120. Component 1 115 may include any of a variety of combinations of security software components including, but not limited to, a firewall application component, an anti-virus application component and an intrusion prevention system application component.

According to an embodiment of the invention, communications between component 1 115 and component 2 120 may include an exchange of information 132 between VM1 110 and VMM 130 and another exchange of information 134 between component 2 120 and VMM 130. The exchanges of information 132 and 134 may variously be implemented or otherwise supported by an exchange of information 136 between VMM 130 and one or more devices of platform hardware 140. Furthermore, exchange of information 132 and exchange of information 134 may be variously either direct or indirect exchanges, for example by any of a variety of security mechanisms such as those discussed herein.

Figure 2:
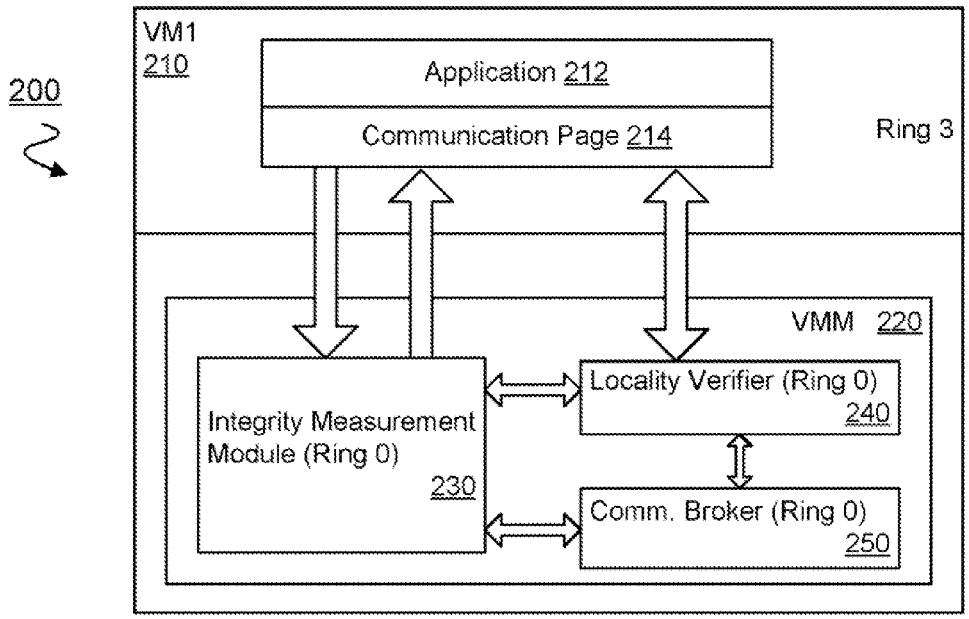
FIG. 2 is a block diagram illustrating privilege levels for components of a virtualization enabled platform to implement an embodiment of the invention.

FIG. 2 illustrates an allocation 200 of privilege levels for a virtualization enabled platform according to an embodiment of the invention. The virtualization enabled platform may, for example, be a platform such as platform 100. A given component may be assigned a particular privilege level based on a desired level of access to be associated with the given component. Components running at a higher privilege level may control other software components running at a lower privilege level. In an embodiment, privilege levels for components of the virtualization architecture may be implemented at least in part by an instruction set architecture (ISA) such as that of the Intel® Pentium® 4 (herein referred to as the IA-32 ISA). IA-32 ISA, for example, includes four privilege levels—ring-0, ring-1, ring-2 and ring-3 (from most secure privilege level to least secure privilege level). In an embodiment, platform 200 may include a VMM 220 to monitor the execution of a virtual machine VM1 210, wherein one or more components of VMM 220 may each run as a root operation in a higher privilege level (e.g. ring-0) than VM1 210, which may run as a non-root operation in a lower privilege level (e.g. ring-3). Accordingly, a privilege level of VM1 210 may be relatively deprivileged with respect to a privilege level of a component of VMM 220 upon which VM1 210 relies for secure communications with other platform components.

VM1 210 may include a component such as an application 212 to communicate with one or more other components of platform 200. In order to secure communications of application 212 a communication page 214 may be allocated to application 212. As used herein, "communication page" refers to a region of memory dedicated to an exchange of data to and/or from a component. In an embodiment, a component may exchange data with other components at least in part by storing (retrieving) data to (from) an allocated communication page. Allocating communication page 214 to application 212 may include registering a memory region with VMM 220 as being dedicated to an exchange of data of application 212.

In an embodiment, application 212 may register communication page 214 with the VMM 220 by presenting to an Integrity Measure Module (IMM) 230 a signed manifest describing the structure of application 212 and/or a memory range which application 212 wants to use for the secure communications. IMM 230 may include any of a variety of combinations of hardware and software components to verify a validity of a component such as application 212. As used herein, "verifying a validity" may include, but is not limited to, verifying that an integrity of a signed manifest of application 212 represents the latest authorized changed state of said manifest, and/or authenticating the application 212 causing or otherwise associated with the latest changed state as being a properly authorized component. Authenticating application 212 may, for example, include verifying a location in memory of a code image of application 212 based on an expected location of the code image. Authenticating application 212 may alternately or additionally include, for example, validating the integrity of the code image of application 212 in memory.

In allocating communication page 214 to application 212, VMM 220 may determine whether an access to the memory region in question is appropriate for such an allocation—e.g. via a component such as a locality verifier 230 to determine whether the component to be allocated a communication page may access the associated memory region. Alternatively or in addition, locality verifier 230 may determine whether any access by another component (e.g. a shared memory region) presents a security threat which precludes the allocation of communication page 215 to application 212. In an embodiment of the invention, access to communication page 214 may be identified and/or enforced by page tables (not shown) maintained by the VMM 220 to map logical/linear addresses provided by components to physical address of a memory such as memory 160. IMM 230 may check with locality verifier 240 to insure that the security of communications of application 212 is not jeopardized by using as a communication page the memory range described in the integrity manifest. For example, if application 212 requests an exclusive communication channel, the IMM may check to ensure that a memory range which application 212 is to use as a communication page is only accessible by application 212 and VMM 220. Additionally, the VMM 220 may refer to a processor register to ensure that the request actually originated from the component which appears to be the source of the request.

In an embodiment of the invention, if application 212 is authenticated and if no security threats are associated with an accessibility of the memory region in question, communication page 214 may be allocated to application 212. The allocation may include entering a reference to the communication page into the page table. Additionally or alternatively, the VMM 220 may clear the contents of the communication page and notify the locality verifier 240 that communication page 214 is to be added to the set of pages it monitors. Application 212 may be informed that the registration succeeded or failed. In an embodiment of the invention, the allocated communications page of application 212 may be accessed only by application 212 and the VMM 220.

If the registration succeeded, application 212 can start using communication page 214 to send a communication to and/or receive a communication from another component. In an embodiment of the invention, access to the communication page used by application 212 is restricted to integrity protected components (e.g. application 212 and the VMM 220). If an unauthorized agent tries to access a communications page which is protected using protected page tables, a page fault occurs which can be checked by the VMM 220 and disallowed. On the other hand, no page fault results if application 212 attempts to access its assigned communication page.

VMM 220 may further include a component such as a communication broker 250 to exchange data to/from communication page 214 on behalf of application 214. For example, communication broker 250 may associate a request-object with communication page 214 to identify and/or control communications via communication page 214. The request-object may be generated by accessing information describing communication page 214—for example, by parsing a header of communication page 214 which is created when application 212 registers communication page 214. The request-object may include any of a variety of combinations of information including, but not limited to, an identification code to identify communication page 214, context information describing permissible uses of communication page 214, a pointer to communication page 214 and meta-data describing a structure of communication page 214. Additionally or alternatively, the communication broker 250 may maintain a queue of all request-objects for which communication broker 250 provides a service. Communication broker 250 may then sequentially update respective communication pages associated with the request-objects according to the queue.

Figure 3:
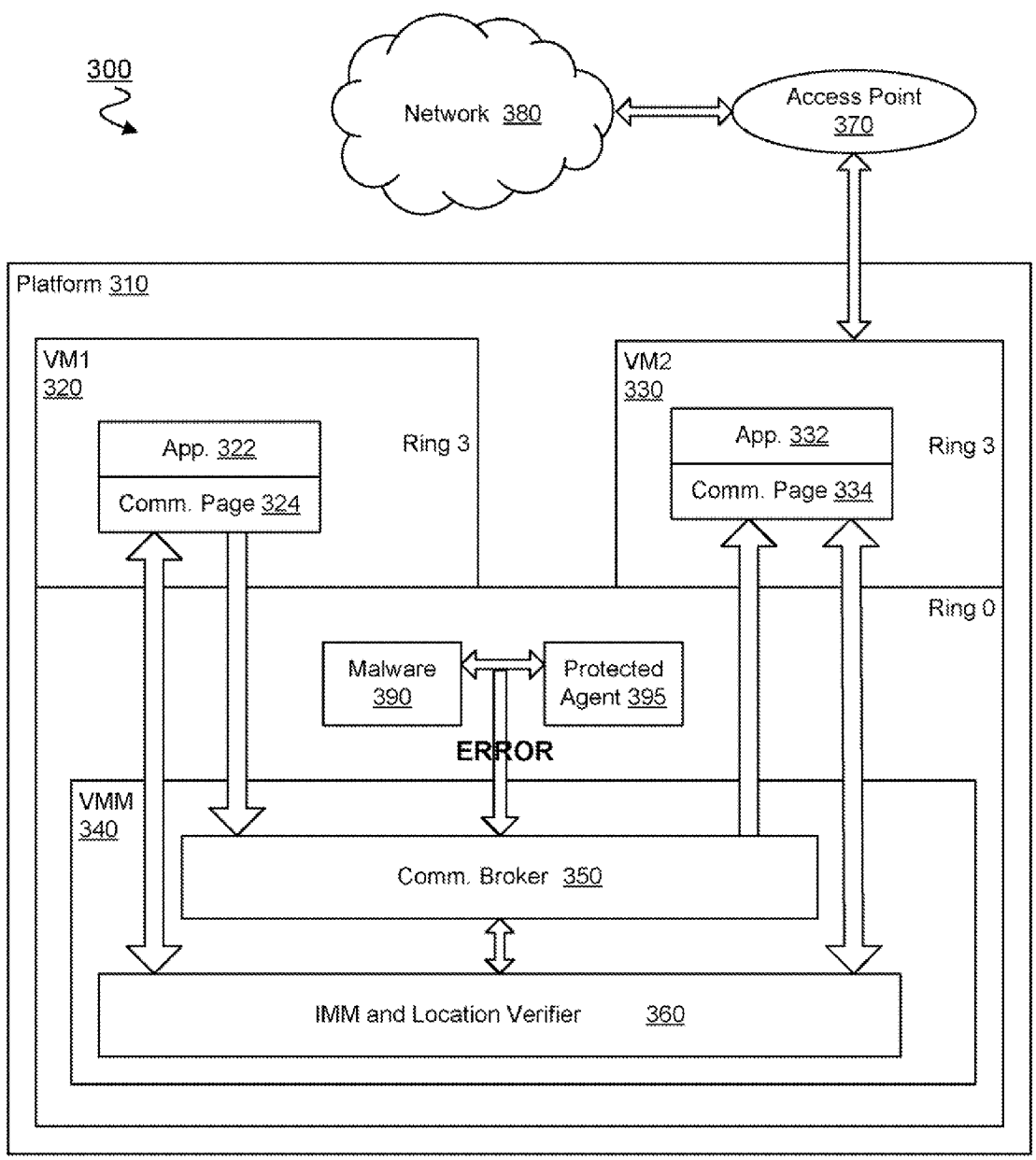
FIG. 3 is a block diagram illustrating a communication of information between components of a virtualization enabled platform according to an embodiment of the invention.

FIG. 3 illustrates an exchange of data in a platform 310 according to an embodiment of the invention. Platform 310 may be part of a system 300 which also includes a network 380 to which platform 310 may connect, e.g. via an access point 370. In an embodiment, the connection of platform 310 to network 380 may be regulated by an end-point access control decision. For example, the end-point access control decision may require a service of an application 332 running on a virtual machine VM2 330 of platform 310. In turn, the services of application 332 may require a data exchange within platform 310 such as a communication to application 332 of state information of an application 322 running on a virtual machine VM1 320.

Application 322 and application 332 may have each registered with VMM 340 to avail of communication security mechanisms provided by VMM 340 according to an embodiment of the invention. For example, application 322 may have registered a communication page 324 for securing communication, while application 332 may have registered a communication page 334. The allocation of communication page 324 and communication page 334 to application 322 and application 322, respectively, may be similar to that described with reference to FIG. 2. For example, VMM 340 may include an IMM and location verifier 360 and a communication broker 350—e.g. such as, respectively, IMM 230, location verifier 240 and communication broker 250. While any of a variety of privilege levels may be assigned to the various components, FIG. 3 shows VM1 320 and VM2 330 each executing components in respective ring-3 privilege levels, while VMM 340 is shown executing in a ring-0 privilege level.

Transferring data between application 322 and application 332 may be via a communication channel implemented at least in part by the VMM 340 providing a copy of information stored in one of communication page 324 and communication 334 to the other of communication page 324 and communication 334. For example, with a registered communication page 324, application 322 may request VMM 340 to establish a communication channel wherein communication broker 350 exchanges data on behalf of application 322 via communication page 324. In an embodiment of the invention, application 322 may store information in communication page 324 data to be exchanged between application 322 and another component such as application 332. The communication broker 350 may exchange this data, for example, by providing to communication page 334 a copy of data written to communication page 324. Alternatively or in addition, communication broker 350 may provide to communication page 324 a copy of data written to communication page 334 by application 332. In an embodiment, the communication page 324 assigned to application 322 may be accessible by application 322 and the VMM 340, and not accessible to application 332. Similarly, the communication page 324 assigned to application 332 may be accessible by application 332 and the VMM 340, and not accessible to application 322.

Application 322 may request a communication channel by writing data to its communication page 324 and providing to the VMM 340 an indication that new data is on the communication page 324. For example, application 322 may initiate or otherwise cause the platform 310 to execute a VM exit in order to cause a transition of control from VM1 320 to VMM 340. This VM exit may occur by executing an instruction designated for this purpose, referred to herein as a "VMCALL". For purposes of discussions herein, the execution of VMCALL may cause a virtualization event.

In response to a VMCALL, the VMM 340 may access the communication page 324 of application 322 and process any data found therein. For example, the VMM 340 may find in the communication page 324 of application 322 data addressed to application 332, and provide a copy of the data to the communication page 334 assigned to application 332. If an unauthorized agent—e.g. a protected agent 395 which has been infected with malware 390—tries to access a protected communication page, VMM 340 may refer to a request-object for the protected communication page and detect a page fault error indicating that the attempted access should be disallowed. In one embodiment of the invention, an exchange of data between the communication page 324 of application 322 and the communication page 334 of application 332 may be based on the VMM 340 determining if such a communication is allowed by a security policy. For example, the VMM 340 may restrict a use of communication page 324 in data exchanges with communication page 334 depending on whether communication page 334 is accessible by a component of platform 310 which VMM 340 has not authenticated.

Figure 4:
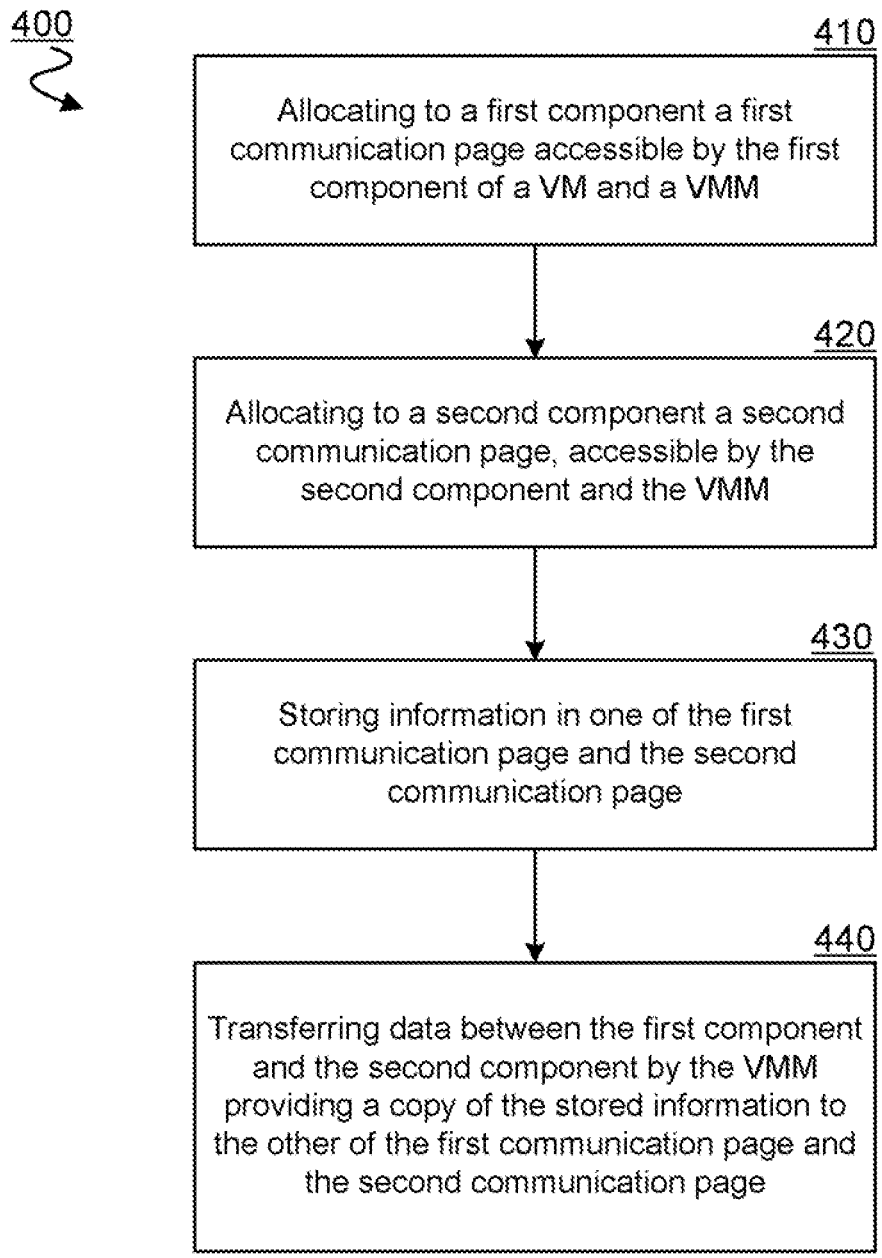
FIG. 4 is a flow diagram illustrating an algorithm for communicating information between components of a virtualization enabled platform according to an embodiment of the invention.

FIG. 4 illustrates a state diagram 400 for an algorithm according to one embodiment of the invention. State diagram 400 may represent a method of communication as discussed with respect to platform 310, for example. The algorithm includes, at 410, allocating to a first component executing on a first VM a first communication page accessible by the first component and a VMM. In an embodiment, the VMM is providing virtualization hardware support to implement the VM on which the first component executes. The algorithm 400 further includes, at 420, allocating to a second component on the platform a second communication page accessible by the second component and the VMM. In an embodiment of the invention, the VMM may ensure that access to the first communication page and the second communication page is restricted. For example, the VMM may check to insure both that the first communication page is not accessible by any other component of the platform executing in the first VM, and that the second communication page is not accessible by any other component of the platform executing in a VM in which the second component is executing. The algorithm 400 further includes, at 430, storing information on one of the first communication page and the second communication page. The algorithm 400 further includes, at 440, transferring data between the first component and the second component by the VMM providing a copy of the stored information to the other of the first communication page and the second communication page.

Techniques and architectures for data communication are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps may require physical manipulations of physical quantities which may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM, EPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method of communicating data in a virtualization enabled platform, the method comprising:
    allocating a first communication page to a first component executing in a first virtual machine (VM) of the platform, wherein an integrity measure module (IMM) of a Virtual Machine Monitor (VMM) verifies that a memory region of the first communication page is accessible by only the first component and the VMM, wherein the VMM provides virtualization hardware support for the platform, wherein allocating the first communication page to the first component includes the VMM creating a request object associated with the first communication page, the request object indicating a permissibility of a use of the first communication page, wherein allocating the first communication page to the first component is based on an authentication of the first component by the IMM, the authentication including:
        verification of a location in memory of a code image of the first component, the verification based on an expected location of the code image; or
        validation of an integrity of the code image;
    allocating a second communication page to a second component of the platform, the second component executing in a second VM of the platform, wherein the second communication page is accessible by both the second component and the VMM;
    detecting a VM exit initiated by the first component in order to cause a transition of control from the first VM to the VMM;
    in response to detecting the VM exit, the VMM detecting for a page fault error based on the request object to determine whether a requested access of the first communication page is to be allowed; and
    where the requested access of the first communication page is determined to be allowed, with the VMM:
        automatically accessing information stored in the memory region of the first communication page by the first component; and
        transferring data through a communication channel between the first component and the second component, including the VMM providing to the second communication page a copy of the information stored in the memory region of the first communication page by the first component.

2. The method of claim 1, wherein providing the copy of the information stored in the memory region of the first communication page to the second communication page is based on whether the second communication page is accessible by a component of the platform which the VMM has not authenticated.

3. The method of claim 1, wherein the second communication page is not accessible by the first component.

4. The method of claim 3, wherein the second component is executing in a second VM, and wherein the second communication page is not accessible by any other component of the platform executing in the second VM.

5. The method of claim 1, wherein the transferring data through a communication channel is in response to a request from one of the first component and the second component, the method further comprising:
    verifying that the one of the first component and the second component is the source of the request via the VMM referring to a processor register.

6. The method of claim 1, wherein the second component is a reporting agent providing access control services on behalf of the platform.

7. A non-transitory computer-readable storage medium having stored thereon a set of instructions which, when executed by one or more processors, causes the one or more processors to perform a method on a virtualization enabled platform, the method comprising:
    allocating a first communication page to a first component executing in a first virtual machine (VM) of the platform, wherein an integrity measure module (IMM) of a Virtual Machine Monitor (VMM) verifies that a memory region of the first communication page is accessible by only the first component and the VMM, wherein the VMM provides virtualization hardware support for the platform, wherein allocating the first communication page to the first component includes the VMM creating a request object associated with the first communication page, the request object indicating a permissibility of a use of the first communication page, wherein allocating the first communication page to the first component is based on an authentication of the first component by the IMM, the authentication including:
  verification of a location in memory of a code image of the first component, the verification based on an expected location of the code image; or
  validation of an integrity of the code image;
allocating a second communication page to a second component of the platform, the second component executing in a second VM of the platform, wherein the second communication page is accessible by both the second component and the VMM;
detecting a VM exit initiated by the first component in order to cause a transition of control from the first VM to the VMM;
in response to detecting the VM exit, the VMM detecting for a page fault error based on the request object to determine whether a requested access of the first communication page is to be allowed; and
where the requested access of the first communication page is determined to be allowed, with the VMM:
  automatically accessing information stored in the memory region of the first communication page by the first component; and
  transferring data through a communication channel between the first component and the second component, the transferring including the VMM providing to the second communication page a copy of the information stored in the memory region of the first communication page by the first component.

8. The computer-readable storage medium of claim 7, wherein providing the copy of the information stored in the memory region of the first communication page is based on whether the second communication page is accessible by a component of the platform which the VMM has not authenticated.

9. The computer-readable storage medium of claim 7, wherein the second component is a reporting agent providing access control services on behalf of the platform.

\* \* \* \* \*